3,099,587
FUEL CELLS
Hubert Harold Chambers, New Malden, and Anthony
Desmond Shand Tantram, Dorking, England, assignors
to National Research Development Corporation, London, England, a British corporation
Filed Nov. 23, 1959, Ser. No. 854,896
Claims priority, application Great Britain Dec. 17, 1956
10 Claims. (Cl. 136—86)

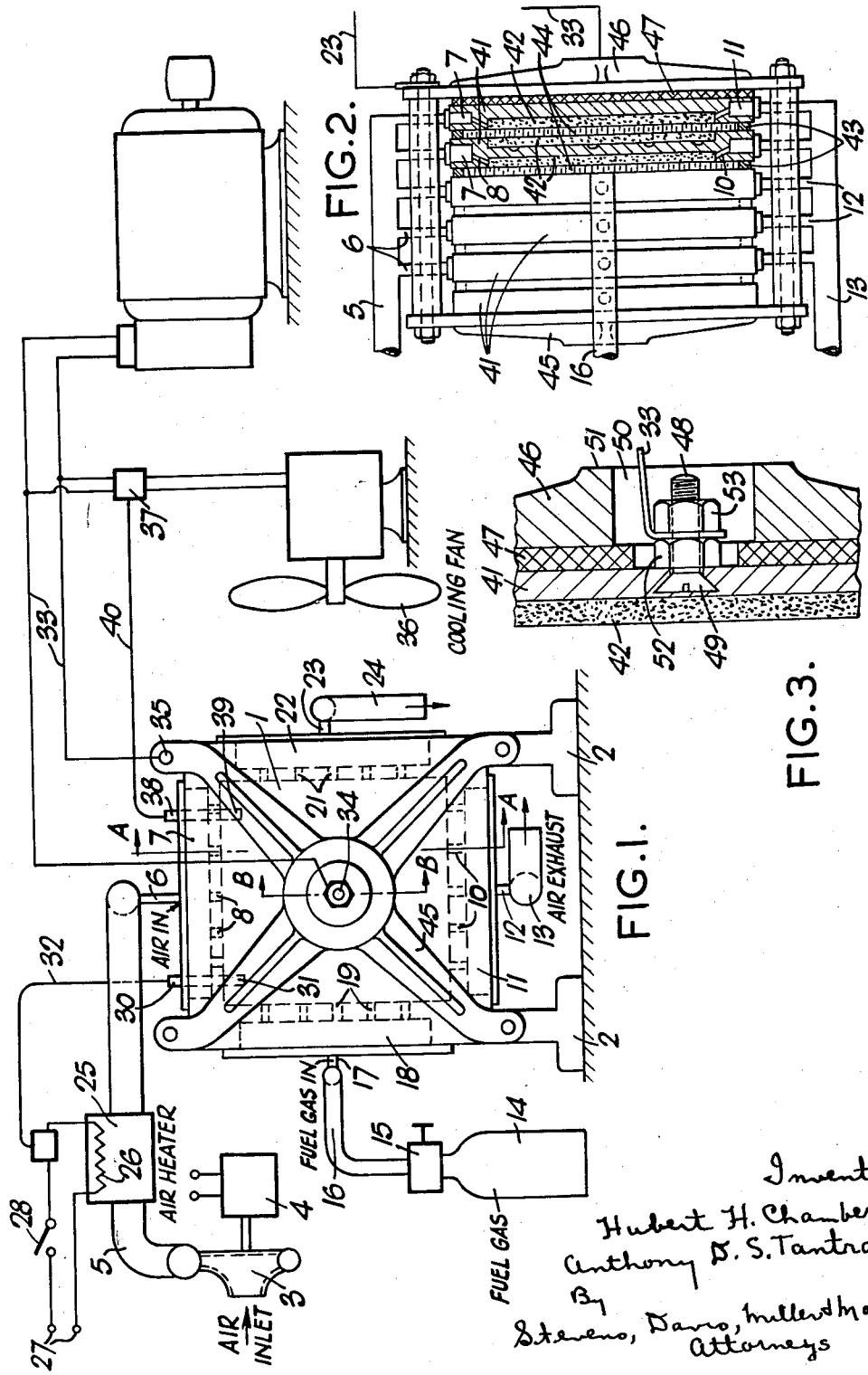

This application is a continuation-in-part of our application Serial No. 699,902, filed December 2, 1957, now abandoned.

This invention relates to fuel cells for the electrochemical generation of electricity of the type in which the overall cell reaction is the oxidation of a fuel by oxygen or an oxygen-containing gas such as air. The term "fuel cell" as used hereinafter is to be understood as meaning a fuel cell of this type.

The essential components of a fuel cell are two electrodes in contact with the oxygen-containing gas and the fuel respectively, and an electrolyte. The function of the electrolyte is to permit transport of oxygen ions or oxygen-containing ions, and to prevent direct contact between the fuel and the oxygen-containing gas, so that oxidation of the fuel can take place only as a result of a directed flow of ions across the electrolyte and a corresponding flow of electrons in an external circuit. Hence the electrolyte must be impermeable to gas but permeable to ions. It must also be impermeable to electrons, that is to say, it must be a true ionic conductor and possess no electronic or positive hole conduction.

It is desirable to operate fuel cells at the lowest possible temperature but, because most carbon-containing fuels are relatively unreactive at ordinary temperatures, it is in practice necessary to work above about 500° C. to avoid polarisation due to slow electrode and other reactions. Aqueous electrolytes cannot be used at such temperatures and it has been proposed to use solid or fused carbonates, particularly those of the alkali metals. These salts have relatively low melting points and show good ionic conductivity both in the fused state and in the solid state above about 500° C. We have, however, found that the use of a carbonate electrolyte has a deleterious effect which arises in the following way:

When a carbonate electrolyte is used, the oxygen is transported across the electrolyte in the form of carbonate ions which are discharged at the fuel electrode to give oxygen and carbon dioxide. The oxygen oxidises the fuel and the carbon dioxide is discharged to waste, together with the combustion products. For each carbonate ion discharged at the fuel electrode one oxygen ion is formed at the oxygen electrode and combines with a metal ion to form the metal oxide. Thus, as the cell continues to deliver current the electrolyte slowly becomes converted from carbonate to oxide and eventually the cell ceases to function because of the rise in internal resistance. This difficulty can be mitigated if the gas fed to the oxygen electrode contains sufficient carbon dioxide to enable carbonate ions to be formed instead of oxygen ions. It is the necessity for supplying carbon dioxide as well as oxygen to the oxygen electrode which is the main disadvantage of the carbonate electrolyte. A similar objection applies to any electrolyte which transports oxygen in the form of oxygen-containing ions, because some means of regenerating the oxygen containing ion must always be provided.

We have found that it is possible to avoid this disadvantage by using as the electrolyte a fusible mixture which includes a metal oxide and, when molten, contains oxygen ions which are discharged preferentially at the fuel electrode.

According to the invention the electrolyte of a fuel cell comprises a fusible metal fluoride or mixture of fluorides (including at least one alkali metal fluoride) and at least one metal oxide which is capable of dissolving, and of forming oxygen ions, in the molten fluoride or mixture of fluorides.

The invention will be more readily understood by the following examples, which illustrate but do not limit the invention, and by means of the accompanying drawings in which:

FIGURE 1 is a diagrammatic illustration of a complete fuel cell installation,

FIGURE 2 is a side elevation of a fuel cell battery in FIGURE 1 with two of the individual fuel cells shown in cross-section on the line A—A of FIGURE 1, and FIGURE 3 is a fragmentary view of the terminal fixing on the line B—B of FIGURE 1.

For the electrolyte, oxides of magnesium, aluminium or beryllium may be used with special advantage. The fluorides may advantageously be the alkali metal fluorides with or without the fluoride of the metal whose oxide forms the solute. It is preferred to use a eutectic or near eutectic mixture of fluorides, since the melting points of single fluorides or non-eutectic mixtures are generally higher than is necessary for the operation of the cell.

The fluoride melt portion of the electrolyte may consist of one of the following eutectic mixtures:

| Molar percent | Melting point, ° C. |
|---|---|
| (a) Sodium fluoride, 11.5; potassium fluoride, 42.0; lithium fluoride, 46.5 | 454 |
| (b) Lithium fluoride, 53; magnesium fluoride, 47 | 718 |
| (c) Sodium fluoride, 40; potassium fluoride, 60 | 710 |
| (d) Lithium fluoride, 61; sodium fluoride, 39 | 652 |
| (e) Lithium fluoride, 50; potassium fluoride 50 | 492 |
| (f) Sodium fluoride, 6.5; lithium fluoride, 46.5; rubidium fluoride, 47.0 | 426 |
| (g) Magnesium fluoride, 6.5; sodium fluoride, 34.5; potassium fluoride, 59.0 | 685 |
| (h) Magnesium fluoride, 10; sodium fluoride, 43; lithium fluoride, 47 | 630 |

Examples of complete electrolytes are as follows:

(1) A 2½% solution (by weight) of magnesium oxide in fluoride eutectic (a) above.

(2) A 10% solution (by weight) of magnesium oxide in fluoride eutectic (b) above.

(3)

| | Molar percent |
|---|---|
| Magnesium oxide | 10 |
| Sodium fluoride | 36 |
| Potassium fluoride | 54 |

(4)

| | Percent by weight |
|---|---|
| Aluminium oxide | 3 |
| Lithium fluoride | 16 |
| Sodium fluoride | 38 |
| Aluminium fluoride | 43 |

Electrolytes in accordance with the invention may be used with any electrode otherwise suitable for fuel cells and not attacked by the oxide-fluoride melt, e.g. the silverised zinc electrodes described in British patent specification No. 37215/55. Fuel cells made in this way operate successfully with air or oxygen at temperatures just above the melting point of the electrolyte, and the latter shows substantially no deterioration such as is found with carbonate and similar electrolytes when an ion-regenerating gas is not supplied with the air or oxygen and there is thus no need to supply carbon dioxide to the air or oxygen electrode.

FIGURE 1 illustrates diagrammatically a typical installation. A battery of fuel cells, indicated generally at 1 is mounted on a suitable surface by supports 2. Air is fed by a compressor 3, driven by an electric motor 4, through a pipe 5. The pipe 5 passes along the top of the battery with individual supply pipes 6 feeding air to manifolds 7 formed in the top edge of each cell. From the manifolds the air passes through passages 8 into the porous electrode material 9 which is on one face of each of the electrodes. The air passes through the porous electrode material and then through passages 10 into further manifolds 11 formed in the bottom edge of each cell. From the manifolds it passes through pipes 12 into a pipe 13 where it passes to exhaust.

A similar flow of fuel gas also passes through the cells. A suitable fuel gas is supplied in the present example, from a pressurised storage vessel 14 containing carbon monoxide passing through a pressure inducing and shut off valve 15 via pipe 16 and individual pipes 17 to manifolds 18 formed in the edges of each of the cells. From the manifolds 18 it passes via passages 19 into the porous electrode material 20 on the other face of each of the electrodes and then through passages 21, manifold 22, and pipes 23 to pipe 24 and then to exhaust.

For the cells to operate in series fashion, the cells must be insulated from each other and to this end it is convenient to make the pipes 6, 12, 17 and 23 of electrically insulating material.

Inserted in the pipe 5 from the compressor 3 is an air heater 25, containing an electrical heating element 26, connected to a suitable electrical supply at terminals 27. The heating element can be switched on and off by a switch 28, and by a thermostatically controlled switch 29. Inserted in the fuel cell battery is a thermostat 30, the sensitive element of which, shown dotted at 31, is immersed in the electrolyte of the fuel cells. The thermostat 30 is connected to the switch 29 by a Bourdon tube 32.

The output of the cell is taken by way of leads 33, one of which is connected to a terminal 34, the other lead, which can be considered as the earth lead, being connected to a terminal 35 on one of the members of the fuel cell battery. The output of the battery is shown connected, as an example, to an electric motor.

Whilst the cell is operating, cooling may be required. An electrically driven fan 36 is provided, the motor of which is connected to the leads 33 from the cell. A thermostatically operated switch 37 is placed in the supply to the electric motor of the fan for switching it on and off. Inserted in the fuel battery is a second thermostat 38, the sensing element 39 of which is also immersed in the electrolyte. The thermostat is connected to the switch 37 by a Bourdon tube 40.

The construction of the fuel cell battery will be more readily seen in FIGURE 2. A series of plates 41, made for example of a heat resisting steel or alloy, are provided, except for the end plates, with a cavity on each side, the cavities containing porous material 42. The electrode material consists, for example, of a mixture of metallic silver and zinc oxide. The end plates have only one cavity, which is formed in the face cooperating with the adjacent plate, the cavity being filled with the porous electrode material 42. The plates are separated by annular spacing members 43, which are electrically non-conducting, the spaces 44 thus formed between the plates 41 being filled with electrolyte, for example, fused metal salts.

The assembly of plates and spacers is held together by a pair of spider members 45 and 46 which are bolted together at the four corners, the spacer members forming liquid tight seals between the plates. An electrically insulating member 47 is positioned between the spider 46 and the adjacent end plate.

It will be seen that the plates form a series of electrodes, the material on each side of a plate being connected through the plate itself while the electrode material on adjacent plates is separated by the electrolyte, thus forming a battery of cells in series, one terminal 35 being on the spider member 46 and the other terminal 34, connected to the end plate adjacent to the spider member 46.

Each plate has machined in each of its four edges non-intercommunicating slots forming, respectively, the air and fuel gas manifolds 7, 11, 18 and 22, the air and fuel gas passing from the inlet manifolds 7 and 18 by means of pipes 8 and 19, through the porous electrode material and through pipes 10 and 21 to the outlet manifolds 11 and 22 as described above.

The connection of the lead to the end plate by means of terminal 34 is shown in FIGURE 3. A bolt 48 having a countersunk head 49 is held in a suitably countersunk hole in the end plate 41, the stem of the bolt extending through a hole in the insulating member 47 into a bore 50 in the central boss 51 of the spider member 46. A nut 52 secures the bolt in the plate 41, a second nut 53 securing one of the leads 33 to the bolt.

The porous electrode material can be made in various ways, but in the example described above, a convenient method is to pack a powdered mixture into one of the cavities of the plates, passing the mixture sufficiently to ensure electrical continuity between the particles, but at the same time allowing free access of gas.

The electrolyte in the present particular description is conveniently that described above for Example 1 of complete electrolytes, that is, a 2½% solution (by weight) of magnesium oxide in a fluoride melt consisting of a mixture of sodium fluoride, 11.5 molar percent; potassium fluoride, 42 molar percent, and lithium fluoride, 46.5 molar percent.

The operation of the installation illustrated in FIGURE 1 is as follows. To bring the cell to its operating temperature it is necessary to heat it. This is done by passing air from the compressor 3 through the heater 25. Switch 28 is closed and the element 26 heats the air which passes through the cell battery 1 exhausting at 13. When the battery, and thus the electrolyte, has reached the correct temperature the thermostat 30 shuts off the heating element 26. Valve 15 is opened allowing fuel gas to flow to the battery, the fuel gas flowing through the cells of the battery, the spent gas exhausting at 24. As the reaction within the cell takes place an electrical output is available at the terminals 34 and 35, to which an electrical load, for example an electric motor, can be connected. As the cell operates heat is developed in excess of that lost by normal radiation etc., and the operating temperature of the cell tends in increase. This is controlled by the cooling fan 36. When the temperature of the electrolyte exceeds a predetermined temperature, the thermostat 38 switches on the cooling fan, switching it off again when the electrolyte temperature has fallen to a value slightly lower than that at which the cooling fan is switched on. Should the load be disconnected for a short while, which would mean that less, or no, heat was produced in the battery and the temperature fall, then thermostat 30 would again switch on the heater element 26 to maintain the battery at the operating temperature.

We claim:
1. A fuel cell in which the electrolyte is composed of the fluoride of at least one metal, said electrolyte being molten at the normal operating temperature of the cell, and said fluoride electrolyte containing when molten at least one ionic metal oxide in solution therein, said metal oxide providing free oxygen ions in the molten electrolyte.

2. A fuel cell in which the electrolyte is composed of a mixture of metal fluorides having a composition at least substantially near eutectic proportion, said electrolyte being molten at the normal operating temperature of the cell, and containing up to 10% by weight of an ionic metal oxide which at the operating temperature is in solution therein to provide free oxygen ions in the molten electrolyte.

3. A fuel cell as claimed in claim 1, wherein there is used a mixture of metal fluorides having a composition at least substantially near the eutectic.

4. A fuel cell as claimed in claim 3, wherein at least one of the fluorides in said mixture is an alkali metal fluoride.

5. A fuel cell as claimed in claim 4, wherein the said mixture comprises in addition a fluoride of the metal the oxide of which is included in the electrolyte.

6. A fuel cell as claimed in claim 3, wherein the metal oxide is magnesium oxide.

7. A fuel cell as claimed in claim 3, wherein the oxide is aluminium oxide.

8. A fuel cell as claimed in claim 3, wherein the oxide is beryllium oxide.

9. A fuel cell in which the electrolyte comprises at least one metal fluoride in admixture with an ionic metal oxide, said electrolyte being fusible at the normal operating temperature of said fuel cell, and said metal oxide dissolving to liberate free oxygen ions in said electrolyte when said electrolyte is molten.

10. A fuel cell as claimed in claim 1, wherein the metal fluoride is selected from the class consisting of the fluorides of sodium, potassium, lithium, rubidium, magnesium, aluminium and beryllium, and the ionic metal oxide is selected from the class consisting of the oxides of magnesium, aluminium and beryllium.

References Cited in the file of this patent

UNITED STATES PATENTS

| Re. 21,100 | Greger | May 30, 1939 |
| 711,614 | Britzke | Oct. 21, 1902 |
| 2,384,463 | Gunn et al. | Sept. 11, 1945 |
| 2,914,596 | Gorin et al. | Nov. 24, 1959 |

FOREIGN PATENTS

| 521,773 | Great Britain | May 30, 1940 |